United States Patent
Rupp et al.

(10) Patent No.: US 7,069,001 B2
(45) Date of Patent: Jun. 27, 2006

(54) METHOD FOR SUPPORTING CASHLESS PAYMENT

(75) Inventors: Stephan Rupp, Besigheim (DE); Gerd-Joachim Wintterle, Stuttgart (DE); Matthias Duspiva, Leonberg (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/959,374

(22) Filed: Oct. 7, 2004

(65) Prior Publication Data

US 2005/0101295 A1   May 12, 2005

(30) Foreign Application Priority Data

Nov. 7, 2003   (EP) .................................. 03292800

(51) Int. Cl.
*H04Q 7/20* (2006.01)

(52) U.S. Cl. ...................... 455/411; 455/406; 455/407; 455/408; 455/410; 455/422.1; 455/403; 705/26; 705/27; 705/40; 705/34; 705/35; 380/247

(58) Field of Classification Search ................ 455/406, 455/407, 408, 558, 410, 411, 403, 422.1, 455/426.1, 426.2, 500, 517, 445, 435.1, 435.2; 705/26, 27, 40, 42, 43, 30, 34, 35; 380/247, 380/278

See application file for complete search history.

(56) References Cited

U.S. PATENT DOCUMENTS

| | | |
|---|---|---|
| 6,169,890 B1 | 1/2001 | Vatanen |
| 6,915,272 B1 * | 7/2005 | Zilliacus et al. ............... 705/26 |
| 2002/0116329 A1 | 8/2002 | Serbetcioglu et al. |
| 2002/0161723 A1 | 10/2002 | Asokan et al. |
| 2003/0128822 A1 | 7/2003 | Leivo et al. |

FOREIGN PATENT DOCUMENTS

| | | |
|---|---|---|
| DE | 100 02 032 A1 | 7/2001 |
| EP | 1 197 928 A2 | 4/2002 |
| EP | 1 221 669 A1 | 7/2002 |
| FR | 2 829 647 A1 | 3/2003 |
| WO | WO 01 71627 A2 | 9/2001 |

* cited by examiner

*Primary Examiner*—Keith Ferguson

(74) *Attorney, Agent, or Firm*—Sughrue Mion, PLLC

(57) ABSTRACT

The invention concerns a method for supporting cashless payment as well as a payment interworking server, a mobile terminal and a computer program product for a cashless payment system. A mobile subscriber identity stored in the subscriber identification module of the mobile terminal is sent to a payment interworking unit. The payment interworking unit transmits the mobile subscriber identity to an authentication server of a mobile communication system which replies an authentication number and a signed response. The authentication number is sent to the mobile terminal which calculates a signed response and transmits the signed response to the payment interworking server. This server compares the singed responses received from the authentication server and from the mobile terminal and sends a confirmation message to a POS unit or a billing system, if the received signed result is correct.

18 Claims, 3 Drawing Sheets

METHOD FOR SUPPORTING CASHLESS PAYMENT

TECHNICAL FIELD

The present invention relates to a method for supporting cashless payment using a mobile communication system, a payment interworking server for a cashless payment system, a mobile terminal for a cashless payment system and a computer program product for a cahless payment system. The invention is based on a priority application EP 03292800.4 which is hereby incorporated by reference.

BACKGROUND OF THE INVENTION

Today's cellular radio system, for example a GSM system (GSM=Global System for Mobile Communication), has an authentication server (HLR) which interacts with subscriber identification modules of mobile terminals for granting access to the cellular radio network. This authentication procedure is used by the mobile exchange to decide whether it should establish a bearer connection with a specific mobile terminal.

Further, U.S. Pat. No. 6,169,890 B1 describes a method for carrying out financial transactions using a mobile telephone system. Each subscriber has a service card which is uniquely associated with the subscriber. A connection between the terminal and the mobile telephone network is established. Access to a service provider's system is provided via said connection. The user enters a card identifying number into the terminal. An authentication is performed by this entered card identification number and user-identifying data read from the SIM card of the terminal. Then, a connection between the terminal and the service provider's payment system is established and the amount to be paid, a confirmation of amount and an approving of payment are given to the service provider's payment system.

It is the object of the present invention to improve cashless payment systems.

SUMMARY OF THE INVENTION

The object of the present invention is achieved by a method for supporting cashless payment using a mobile communication system, wherein the mobile communication system comprises an authentication server which interacts with subscriber identification modules of mobile terminals for granting access to the mobile communication system, the method comprises the steps of: transmitting a mobile subscriber identity stored in a subscriber identification module of a mobile terminal of a user to a payment interworking unit; transmitting the mobile subscriber identity from the payment interworking unit to the authentication server of the mobile communication system and requesting, by the payment interworking unit, the calculation of an authentication number and an associated signed response for the user identified by the transmitted mobile subscriber identity; transmitting the calculated authentication number and signed response back to the payment interworking unit; transmitting the calculated authentication number to the mobile terminal; calculating, by the subscriber identification module of the mobile terminal, a signed response based on the authentication number and an encryption key stored in the subscriber identification module and transmitting the calculated signed response to the payment interworking unit; and comparing, by the payment interworking unit, the signed results calculated by the subscriber identification module with the signed result received from the authentication server and sending a confirmation message to a POS unit or a billing system, if the received signed result is correct. The object of the present invention is further achieved by a payment interworking server for a cashless payment system using such mobile communication system, wherein the payment interworking server comprises a control unit that transmits a subscriber identity stored in the subscriber identification module of a mobile terminal of a user to the authentication server of the mobile communication system, requests the calculation of an authentication number and associated signed response for the user identified by the transmitted mobile subscriber identity, receives the calculated authentication number and signed response from the authentication server of the mobile communication system, transmits the calculated authentication number to the mobile terminal or a POS unit which forwards the calculated authentication number to the mobile terminal, receives a signed response calculated by the subscriber identification module of the mobile terminal based on the authentication number and an encryption key stored in the subscriber identification module, and compares a signed result calculated by the subscriber identification module with the signed result received from the authentication server and sends a confirmation message to a POS unit or a billing system, if the received signed result is correct. The object of the present invention is further achieved by a mobile terminal for a cashless payment system using such mobile communication system, wherein the mobile terminal comprises a control unit that transmits the mobile subscriber identities stored in the subscriber identification module of the mobile terminal of a user to a payment interworking unit or to a POS unit for forwarding to a payment interworking unit, receives an authentication number calculated by the authentication server of the mobile communication system on request of the interworking unit, calculates a signed response based on the received authentication number and on an encryption key stored in the subscriber identification module and transmits the calculated signed response to the payment interworking unit or to a POS unit which forwards the calculated signed response to the payment interworking unit. The object of the present invention is further achieved by a computer program product for a cashless payment system using such mobile communication system, wherein the computer program product, when executed by a mobile terminal, performs the aforementioned functions of the mobile terminal control unit.

This invention is built up on the idea to have a payment interworking function between the point of sales and the authentication server of the mobile communication system which simulates vis-á vis the authentication server an exchange of the mobile communication network. Such it reuses the authentication and identification processes of the mobile communication system for a cashless payment system.

The present invention increases the efficiency of the cashless payment system. The cahsless payment system does not require for an own authentication and authorization algorithm. Further, it is not necessary to handle specific personal identification numbers (PINs) or transaction numbers (TANs). Already existing powerful mechanisms of a mobile communication system are reused to provide identification and authentication without the requirement to use this mobile communication system and establish a bearer connection via this mobile communication network. The invention provides a secure, cost efficient and userfriendly authentication of the cashless payment system.

Further advantages are achieved by the embodiments of the invention indicated by the dependent claims.

According to a preferred embodiment of the invention, the mobile terminal is connected to a POS unit (POS=Point of Sales) via a short-range interface and at least a part of the communication between the mobile terminal and the payment interworking unit is carried over this POS unit. The short range interface is, for example, a short range radio interface like a bluetooth interface or a infrared interface. This makes it possible to implement an easy to handle and userfriendly payment process: A mobile terminal can remain in the pocket of the user which stands in the neighborhood of the POS terminal. The amount to be paid, the confirmation of the user and/or the approving of payment by the user can be entered in the POS terminal, without any user interaction between the mobile terminal and the user. The exchange of mobile subscriber identity, authentication number and signed response can be automatically executed between the point of sales and the mobile terminal via the short range interface.

Further, it is also possible that the mobile terminal and the POS unit are connected via a long distance communication network an the POS unit is formed by an internet-server which provides an electronic shop.

Some advantages are achieved when carrying the whole communication between the mobile terminal and the payment interworking unit via the POS unit. The POS unit has full control over the data flow which increases the security and efficiency of the system. For example, the POS unit forwards the mobile subscriber identity to the interworking unit solely when the user has confirmed the amount and has approved the payment. This reduces the work load of the payment interaction unit and increases the security of the system.

Further, the method can be easily adapted to different billing systems and seller's needs: It is possible that the POS unit initiates the payment when receiving the confirmation message from the payment interworking unit. Thereby it is possible to combine the method according to the invention with low-price cashing systems. But, it is also possible that the billing system initiates the payment when receiving the confirmation messages from the payment interworking unit and sends a confirmation to the POS unit about this payment. Further advantages are achieved, if this billing system is a billing system of the mobile operator of the mobile communication system. This system charges the user's mobile operators account when receiving the confirmation message from the payment interworking unit.

Further, the security of the system can be increased by encrypting the communication between the mobile terminal and the payment interworking unit. According to a preferred embodiment of the invention, the mobile terminal encrypts the mobile subscriber identity before sending it to the POS unit and the payment interworking unit decrypts the received mobility subscriber identity, when receiving it from the POS unit. Thereby, the mobile subscriber identity is protected against fraudulent issues.

BRIEF DESCRIPTION OF THE DRAWINGS

These as well as other features and advantages of the invention will be better appreciated by reading the following detailed description of presently preferred examplary embodiments taken in conjunction with accompanying drawings of which:

FIG. 1 shows a mobile communication system 1, a payment interworking server 6, a billing system 7, a communication network 2, a POS unit 51, a mobile terminal 3 and a user 4.

The mobile communication system 1 is formed by a cellular radio network, for example according to the GSM or UMTS standard (GSM=Global System for Mobile Communication; UMTS=Universal Mobile Telecommunications) or IS-95 or CDMA2000 standard. Such systems comprise one or several authentication servers which interact with mobile terminals for granting access to the mobile communication system. Examplary, FIG. 1 shows a GSM based mobile communication system 1 with an authentication server 11, which is formed by the so-called home location register of the GSM network (Home Location Register=HRL). Each time a mobile terminal requests communication services from the mobile communication system 1, the authentication server 11 checks the identity of this mobile terminal by executing an authentication process with the subscriber identity module of this mobile terminal. The authentication server 11 holds for each of the registered subscriber of the mobile communication system 1 an encryption key and a mobile subscriber identity. Further, each of the subscriber identification modules assigned to a registered user of the mobile communication system 1 stores a mobile subscriber identity and encryption key. A mobile terminal is identified by its mobile subscriber identity submitted to the authentication server. The authentication server returns a random number, which is encrypted by the subscriber identity module based on the stored encryption key. The authentication server compares this signed response from the subscriber identification module with the signed response calculated based on the encryption key stored in the authentication server. If the signed result is correct, the authentication server grants access to the mobile communication system.

Figure 1:
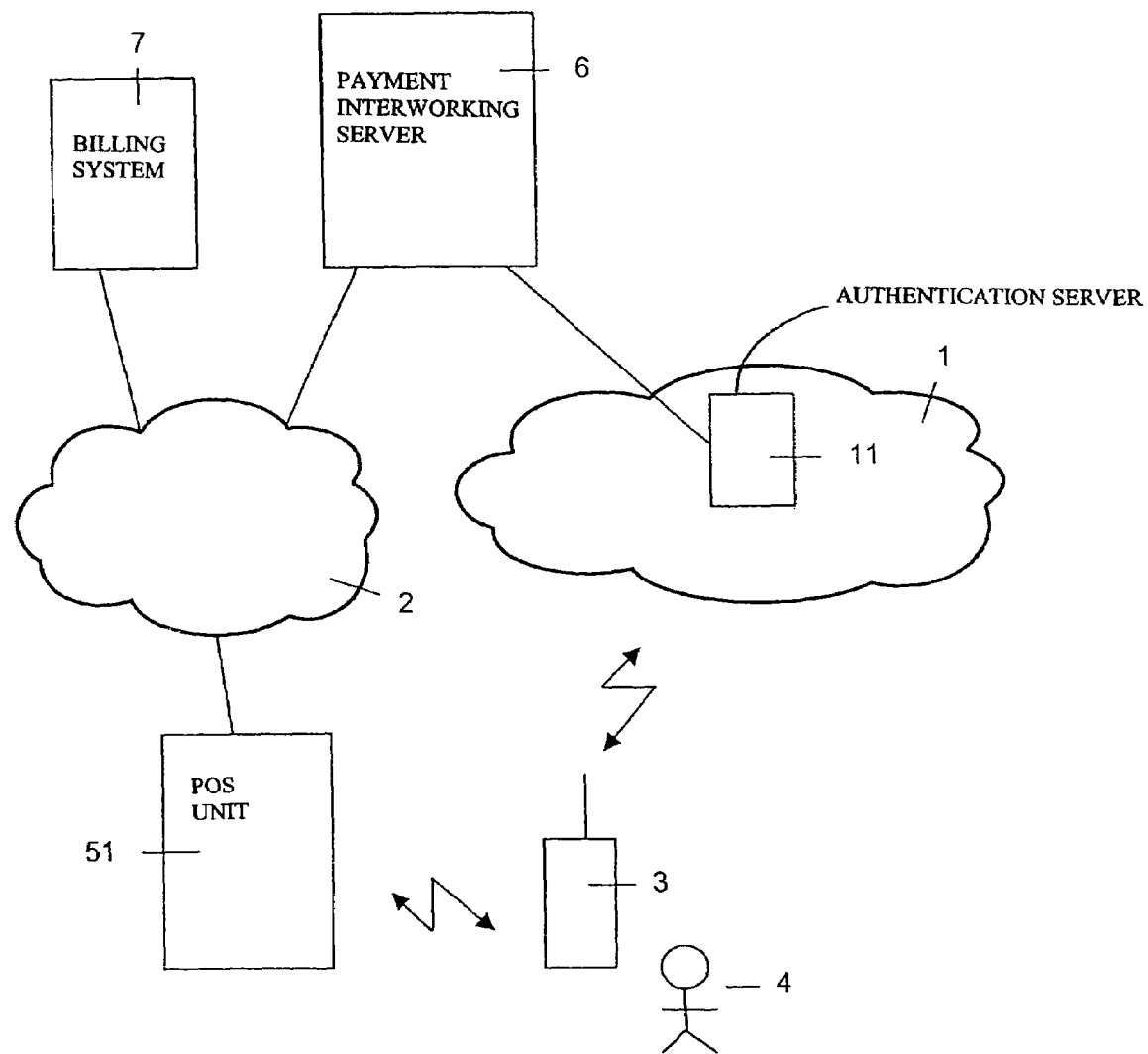
FIG. 1 is a block diagram showing a billing system with a payment interworking server and a mobile terminal according to the invention.

The billing system 7 is a billing system of the operator of the mobile communication system 1, of a bank, credit card institution, or billing agent. This billing system has the possibility to credit or debit the user.

The communication network 2 provides communication between the POS unit 51, the billing system 7 and the payment interworking server 6. The communication network 2 can be constituted by an IP network which comprises a plurality of different physical interconnected networks using an IP protocol as level three protocol (IP=Internet Protocol). But, it is also possible that the communication network 2 is a telephone network, for example a PSTN or ISDN network (PSTN=Public Switched Telecommunication Network; ISDN=Integrated Services Digital Network). Further, it is possible that the network 2 is a mobile network. Further, it is possible that the communication network 2 is formed by a network providing both kind of services, wherein different kind of services are used for the communication between the POS unit 51 and the payment interworking server 6 and between the payment interworking server 6 and the billing system 7.

The POS unit is a till, a point of sales terminal, a vending machine or a ticket machine. The POS unit 51 comprises input and output means, for example a display, a keypad, a microphone, a loudspeaker, a mousepad and so on. Further, it comprises a communication unit for communicating via the communication network 2 and a second communication unit for communicating with the mobile terminal 3 via a short range interface. Such a short range interface is, for example, an infrared or short range radio interface like a bluetooth interface. But, it is also possible that the second communication unit enables a galvanic connection between the mobile terminal 3 and the POS unit 51. Such galvanic connection is provided by a connector or mobile terminal holding device which fits with the data interface of the mobile terminal 3.

The amount to be paid is, for example, entered by the shop keeper or casher in the POS unit. The POS unit transmits the amount to be paid via the short range interface to the mobile terminal 3. The mobile terminal 3 displays the amount to be paid, asking the user to confirm the amount and approving the payment. When the user 4 gives his approval, the mobile terminal 3 sends the mobile subscriber identity stored in the subscriber identification module of the mobile terminal 3 via the short range interface to the POS unit 51. The POS unit 51 sends the received mobile subscriber identity and payment data describing the financial transaction via the communication network 2 to the payment interworking server 6. Such payment data contains, for example, the amount to be paid, the kind of billing system which shall be used for the financial transaction and data identifying an account of the shop holder the amount should be transferred to.

Further, it is possible that user 4 enters his approval in the POS unit 51. According to this embodiment, the mobile terminal 3 can remain in the pocket of the user 4 who stands in the neighborhood of the POS unit 51. The amount to be paid, the confirmation of the user and/or the approving of payment by the user can be entered in the POS unit 51, without any user interaction between the mobile terminal 3 and the user 4. The exchange of mobile subscriber identity, authentication number and a signed response can be automatically executed between the point of sales unit 51 and the mobile terminal 3 via the short range interface. Preferably, the short range interface is a bluetooth interface and the bluetooth paring mechanism is used for establishing this communication. At the first time the mobile terminal 3 and the POS unit 51 has to communicate with each other, the user 4 enters an authentication code in the POS unit 51. This authentication code is already known to the mobile terminal 3 or, for example, entered in parallel by the user 4. In the following, an authorization procedure is executed between the mobile terminal 3 and the POS unit 51 by help of this authorization code. If the authorization is positive, the POS unit 51 and the mobile terminal 3 accept each other and execute the above-described exchange of data.

Payment interworking server 6 sends a request to the authentication server 11 of the mobile communication system 1. This request contains the mobile subscriber identity submitted by the POS unit 51 and requests the calculation of an authentication number and an associated signed response for the user identified by the transmitted mobile subscriber identity. The authentication server 11 checks whether the mobile subscriber identity is assigned to a registered subscriber of the mobile communication system 1. If the check is negative, it sends a corresponding response message to the payment interworking function 6 which stops the further transaction process and sends a corresponding message back to the POS unit 51. If the check is positive, it calculates a random number and encrypts this random number by the key assigned to the subscriber associated with the received mobile subscriber identity. Then, it sends a response to the payment interworking server 6. This response contains this random as authentication number and the calculated signed response. The payment interworking server 6 sends the authentication number via the communication network 2 to the POS unit 51 which forwards it to the mobile terminal 3. The subscriber identification module of the terminal 3 calculates a signed response based on the received authentication number and the encryption key stored in the subscriber identification module. Then, the mobile terminal 3 sends the signed response via the short range interface to the POS unit 51 which forwards the signed response via the communication network 2 to the payment interworking server 6.

The payment interworking server 6 compares the received signed result with the signed result received from the authentication server 11. If this check is positive, it sends a confirmation message to the billing system 7. This confirmation message gives the billing system 7 the confirmation that the user 4, who has approved the payment, is the registered subscriber of the mobile communication system 1 specified by the mobile subscriber identity. Further, the confirmation message may contain additional data as the aforementioned payment data and a further specification of the user 4, for example, submitted by the authentication server 11.

Further, the payment interaction server 6 sends a confirmation to the POS unit 51 and to the mobile terminal 3, the confirmation confirms the successful execution of the financial transaction.

Figure 2:
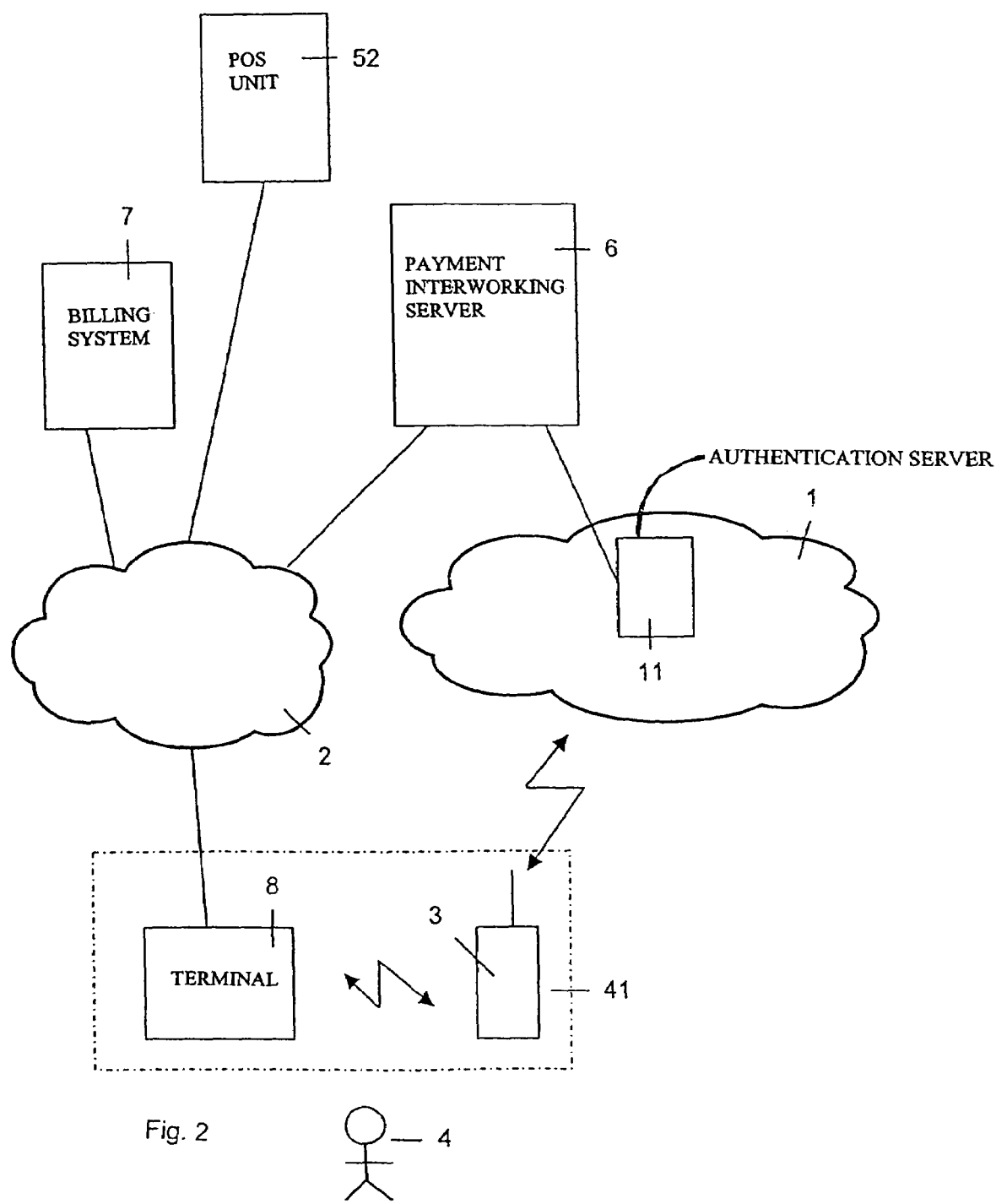
FIG. 2 is a block diagram of another embodiment of a payment system with a payment interworking server and a mobile terminal according to the invention.

FIG. 2 shows the mobile communication system 1 with the authentication server 11, the communication network 2, the payment interworking server 6, the billing system 7, the mobile terminal 3 and the user 4. Further, it shows a POS unit 52 and a terminal 8.

The terminal 8 makes it possible for the mobile terminal 3 to communicate with the POS unit 52 via the communication network 2. For example, the terminal 8 is a computer connected on the one side to the communication network 2 and providing on the other side a short range interface to the terminal 3. Further, it is possible that the terminal 8 provides a graphical user interface to the user 4 which is used by the user 4 to interact with the POS unit 52. For example, the terminal 8 provides a WEB browser for such interaction.

The POS unit 52 is a internet-server which provides fuctionalities of an electronic store, electronic booking or ticketing system. For arranging and acknowledging a financial transaction, the terminal 8 and the mobile terminal 3 at the user side 41 interacts with the POS unit 52. When the user 4 has confirmed an amount which has to be paid and has approved the payment by entering a corresponding command in the mobile terminal 3 or the terminal 8, the POS unit 52 performs the same kind of functionalities as already described for the POS unit 51 according to FIG. 1.

Figure 3:
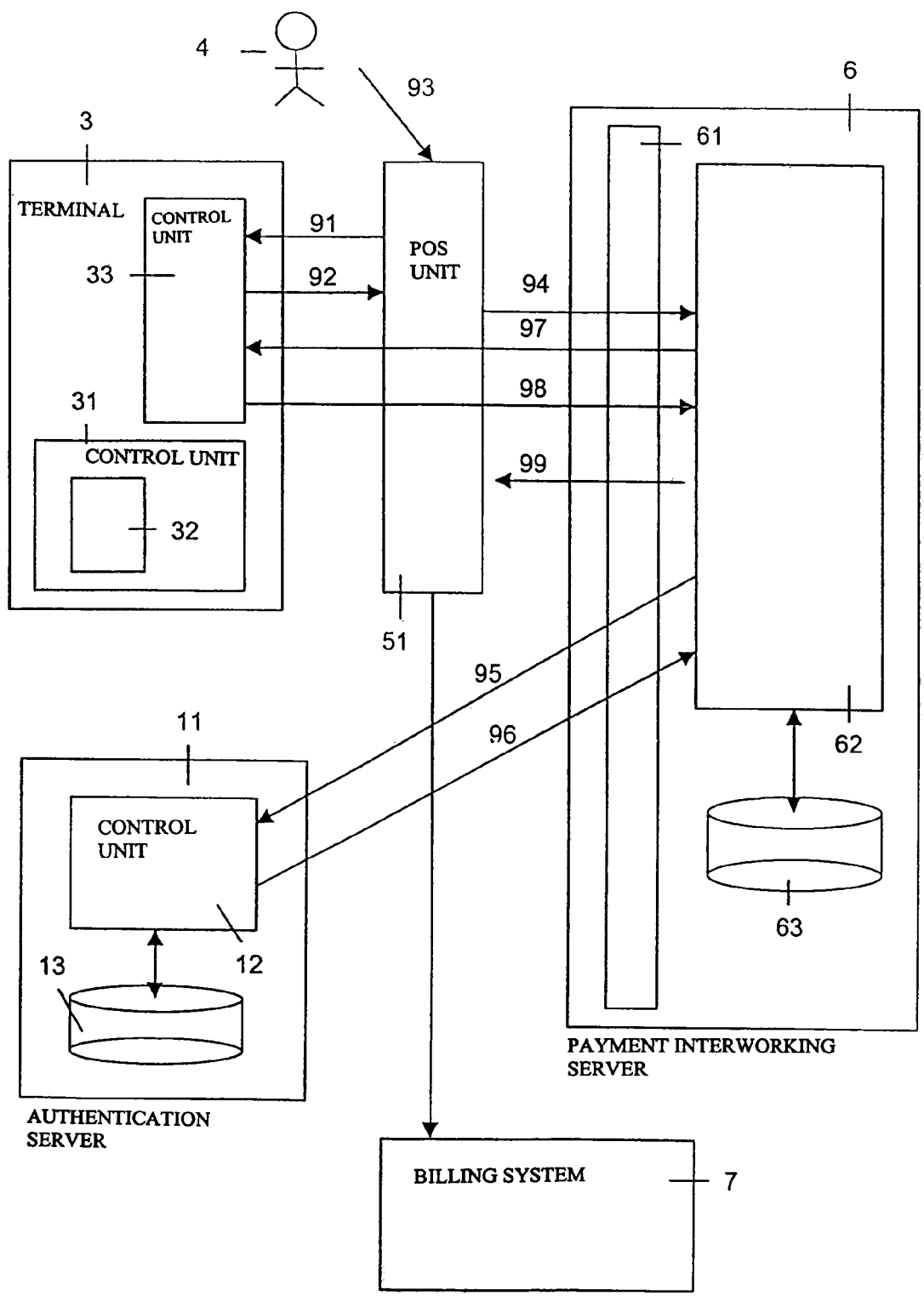
FIG. 3 is a functional view of the payment system according to FIG. 1.

FIG. 3 shows a detailed functional view of a system according to FIG. 1. FIG. 3 shows the terminal 3, the user 4, the POS unit 51, the payment interworking server 6, the authentication server 11 and the billing system 7.

The terminal 3 is a mobile phone, or a PDA or computer with a mobile communication unit (PDA=Personal Digital Assistant). It comprises several input and output means, a microprocessor with associated peripheral components and program code executed by this microprocessor. The functionalities of the mobile terminal 3 are performed by the execution of this program code by the microprocessor. From the functional point of view, the terminal 3 comprises two control units 31 and 33 and a subscriber identification module 32. The control unit 31 comprises all basic functionalities of the mobile terminal 3 which enables the mobile terminal 3 to communicate via the mobile communication system 1. The subscriber identification module 32 is preferably located on a SIM card which is releasable arranged in the mobile terminal 3. The control unit 33 provides the specific functionalities which are necessary for supporting the method according to this invention. Preferably, the control unit 33 is constituted by a software packet downloaded via the mobile communication system 1 to the mobile terminal 3. Such software package is, for example, a JAVA-Midlet. Further, it is possible that the software package is preinstalled in the mobile terminal 3, or in the SIM card of the mobile terminal 3 or is downloaded to the mobile terminal 3 via a data interface of the mobile terminal 3, for example, a bluetooth interface.

This software package as such or a computer readable storage medium with this software package stored on it forms a computer program product according to this invention.

The payment interworking server 6 is formed by one or several interconnected computers, a software platform and application programs executed by these computers. The functionalities of the payment interworking server 6 are performed by the execution of this software by the hardware platform of this computer or these computers. From the functional point of view, the payment interworking server 6 provides a communication unit 61, a control unit 62 and a storage unit 63. The communication unit 61 contains all functionalities of the payment interworking server 6 which enables the payment interworking server 6 to communicate with the POS terminal 51 and the authentication server 11. Preferably, the communication unit 61 contains additional functionalities to establish a secure communication via the communication network 2 and with the authentication server 11.

The authentication server 11 comprises, from the functional point of view, a control unit 12 and a storage unit 13.

If the POS unit 51 receives from the user 4 a command which confirms an amount that should be paid, the POS unit sends a request message 91 via the short range interface to the terminal 3. The control unit 33 handles this request and requests the submission of the mobile subscriber identity from the subscriber identification module 32. Then, it sends the determined mobile subscriber identity, preferably in an encoded form, within a response message 92 to the POS unit 51. If the POS unit 51 receives a further command 93 from the user 4 which approves the payment of the amount, it submits the mobile subscriber identity within a message 94 to the payment interworking server 6. The control unit 62 creates a payment process, sends a request 95 to the authentication server 11 and receives a response 96 containing an authentication number and an associated signed response. The control unit 62 stores the received signed response within the storage unit 63 and forwards the authentication number as part of a response 97 to the POS unit 51, which forwards this response to the terminal 3.

Further, it is possible that the mobile subscriber identity and/or the authentication number are directly transmitted from the mobile terminal 3 to the payment interaction server 6. Further, it is also possible that the authentication server 11 directly transmits the authentication number to the terminal 3 via the mobile communication system 1.

The control unit 33 forwards the received authentication number to the subscriber identification module 32 and requests the calculation of the associated signed response. If it receives the signed response, it submits the signed response within a message 98 to the POS unit 51 which forwards this message to a payment interworking server 6. The payment process of the control unit 62 associated with this transaction compares the received signed response with the associated signed response stored in the storage unit 63. If the signed response is correct, it sends a confirmation message 99 to the POS unit 51. Further, the payment process records an associated transaction record containing the relevant data of the authorization, for example, a log file storing the details of the communication with the POS unit and the authentication server 11 of the mobile communication system 1. Further, it assigns a transaction reference number to this record and submits this reference number within the confirmation message 99 to the POS unit 51. This reference number may be lateron used by the shop holder to prove positive authentication by the payment interworking server 6.

Preferably, the communication between the mobile terminal 3 and the POS unit 51 is a secured communication, which uses, for example, a specific security protocol like a SSL secured protocol layer. Further, the communication between the POS terminal 51 and the payment interworking server 6 is based on a secured connection established via the communication network 2.

Further, it is possible that the control unit 12 submits to the payment interworking server 6 additional information containing data like the credit rating or a maximum transaction amount. Such data is elected by the control unit 12 from the subscriber data available within the mobile communication system. Further, it is possible that the amount of the transaction is submitted within the message 93 to the authentication server 11, which gives in the message 96 a response whether this amount is acceptable or not acceptable.

When receiving the confirmation message 99, the POS unit 51 creates the transaction data and submits it to the billing system 7. This billing system might be, for example, a bank which performs a bank transfer, for example, on the basis of direct debiting mandate. Further, it is possible that the POS unit collects additional payment data from a bank card or credit card provided by the user 4.

The invention claimed is:

1. A method for supporting cashless payment using a mobile communication system, wherein the mobile communication system comprises an authentication server which interacts with subscriber identification modules of mobile terminals for granting access to the mobile communication system, wherein the method comprises the steps of:

transmitting a mobile subscriber identity stored in a subscriber identification module of a mobile terminal of a user to a payment interworking unit;

transmitting the mobile subscriber identity from the payment interworking unit to the authentication server of the mobile communication network and requesting, by the payment interworking unit, the calculation of an authentication number and an associated signed response for the user identified by the transmitted mobile subscriber identity;

transmitting the calculated authentication number and signed response back to the payment interworking unit;

transmitting the calculated authentication number to the mobile terminal;

calculating, by the subscriber identification module of the mobile terminal, a signed response based on the authentication number and an encryption key stored in the subscriber identification module and transmitting the calculated signed response to the payment interworking unit; and comparing, by the payment interworking unit, the signed response calculated by the subscriber identification module with the signed response received from the authentication server and sending a confirmation message to a POS unit or a billing system, if the received signed response is correct.

2. The method of claim 1, wherein
the mobile terminal is connected via a short range interface to a POS unit, and that at least a part of the communication between the mobile terminal and the payment interworking unit is carried out over the POS unit.

3. The method of claim 1, wherein
the POS unit initiates the payment when receiving the confirmation message from the payment interworking unit.

4. The method of claim 1, wherein
the billing system initiates the payment when receiving the confirmation message from the payment interworking unit and sends a confirmation to the POS unit about the payment.

5. The method of claim 4, wherein
the billing system is a billing system of the mobile operator of the mobile communication network which charges the users' mobile operator account when receiving the confirmation message from the payment interworking unit.

6. The method of claim 1, wherein
the mobile terminal sends the mobile subscriber identity to a POS unit, and that the POS unit forwards the mobile subscriber identity to the payment interworking unit when the user enters to accept the transaction.

7. The method of claim 1, wherein
the mobile terminal encrypts the mobile subscriber identity before sending it to the POS unit and that the interworking unit decrypts the received mobile subscriber identity.

8. The method of claim 1, wherein the mobile subscriber identity is transmitted from the mobile terminal to the POS unit and the POS unit transmits the mobile subscriber identity to the payment interworking unit through a communication network when the user confirms and approves an amount of a payment.

9. The method of claim 8, wherein the POS unit, the billing system and the payment interworking unit are connected to each other through the communication network.

10. The method of claim 1, wherein an amount to be paid to the POS unit is entered into an input device by a cashier of the POS unit and the POS unit transmits the amount to be paid to the mobile terminal, the mobile terminal displays the amount to be paid, requests the user to approve the amount and when the user approves, the mobile terminal sends the mobile subscriber identity to the POS unit, the POS unit transmits the mobile subscriber identity and payment data to the payment interworking unit through a communication network.

11. The method of claim 1, wherein the mobile subscriber identity is transmitted from the mobile terminal directly to the payment interworking unit through the mobile communication system and wherein the authentication server directly transmits the authentication number to the mobile terminal through the mobile communication system.

12. The method of claim 1, wherein if the received signed response is incorrect, a response message having data which specifies a stop payment transaction process is sent to the payment interworking unit and the POS unit.

13. A payment interworking server for a cashless payment system using a mobile communication system, wherein the mobile communication system comprises an authentication server which interacts with subscriber identification modules of mobile terminals for granting access to the mobile communication system, the payment interworking server comprises a control unit which:
transmits a subscriber identity stored in the subscriber identification module of a mobile terminal of a user to the authentication server of the mobile communication system and requesting the calculation of an authentication number and associated signed response for the user identified by the transmitted mobile subscriber identity;
receives the calculated authentication number and signed response from the authentication server of the mobile communication system;
transmits the calculated authentication number to the mobile terminal or a POS unit which forwards the calculated authentication number to the mobile terminal; receiving a signed response calculated by the subscriber identification module of the mobile terminal based on the authentication number and an encryption key stored in the subscriber identification module; and
compares the signed response calculated by the subscriber identification module with the signed response received from the authentication server and sending a confirmation message to a POS unit or a billing system, if the received signed response is correct.

14. The payment interworking server of claim 13, wherein an amount to be paid to the POS unit is entered into an input device by a cashier of the POS unit and the POS unit transmits the amount to be paid to the mobile terminal, the mobile terminal displays the amount to be paid, requests the user to approve the amount and when the user approves, the mobile terminal sends the mobile subscriber identity to the POS unit, the POS unit transmits the mobile subscriber identity and payment data to the payment interworking unit through a communication network.

15. A mobile terminal for a cashless payment system using a mobile communication system, wherein the mobile communication system comprises an authentication server which interacts with subscriber identification modules of mobile terminals for granting access to the mobile communication system, the mobile terminal comprises a control unit which:
transmits the mobile subscriber identity stored in the subscriber identification module of the mobile terminal of a user to a payment interworking unit or to a POS unit for forwarding it to a payment interworking unit;
receives, an authentication number calculated by the authentication server of the mobile communication system on request of the payment interworking unit;
calculates, a signed response based on the received authentication number and an encryption key stored in the subscriber identification module; and
transmits the calculated signed response to the payment interworking unit or to a POS unit which forwards the calculated signed response to the payment interworking unit,
wherein the payment interworking unit compares the calculated signed response with another signed response received from the authentication server and sends a confirmation message to the POS unit or a billing system, if the another signed response is correct.

16. The mobile terminal of claim 15, wherein an amount to be paid to the POS unit is entered into an input device by a cashier of the POS unit and the POS unit transmits the amount to be paid to the mobile terminal, the mobile terminal displays the amount to be paid, requests the user to approve the amount and when the user approves, the mobile terminal sends the mobile subscriber identity to the POS unit, the POS unit transmits the mobile subscriber identity and payment data to the payment interworking unit through a communication network.

17. A computer program product for a cashless payment system using a mobile communication system, wherein the mobile communication system comprises an authentication server which interacts with subscriber identification modules of mobile terminals for granting access to the mobile communication system, the computer program product, when executed by a mobile terminal, performs the steps of:

transmitting the mobile subscriber identity stored in the subscriber identification module of the mobile terminal of a user to a payment interworking unit or to a POS unit for forwarding it to the payment interworking unit;

receiving, at the payment interworking unit, an authentication number and an associated signed response calculated by the authentication server of the mobile communication system on request of the payment interworking unit;

initiating the calculation of a signed response, by the mobile terminal, based on the received authentication number and an encryption key stored in the subscriber identification module;

transmitting the calculated signed response to the payment interworking unit or to a POS unit which forwards the calculated signed response to the payment interworking unit; and comparing, by the payment interworking unit, the signed response calculated by the mobile terminal with the associated signed response calculated by the authentication server and sending a confirmation message to the POS unit or a billing system, if the associated signed response is correct.

18. The computer program product of claim 17, wherein an amount to be paid to the POS unit is entered into an input device by a cashier of the POS unit and the POS unit transmits the amount to be paid to the mobile terminal, the mobile terminal displays the amount to be paid, requests the user to approve the amount and when the user approves, the mobile terminal sends the mobile subscriber identity to the POS unit, the POS unit transmits the mobile subscriber identity and payment data to the payment interworking unit through a communication network.

* * * * *